(12) United States Patent  
Payton

(10) Patent No.: US 8,641,956 B1
(45) Date of Patent: Feb. 4, 2014

(54) GASKET FOR A MOLDED PART AND METHOD OF MANUFACTURE AND USE

(76) Inventor: George Roy Payton, Chino Hills, CA (US)

( * ) Notice: Subject to any disclaimer, the term of this patent is extended or adjusted under 35 U.S.C. 154(b) by 127 days.

(21) Appl. No.: 13/287,054

(22) Filed: Nov. 1, 2011

Related U.S. Application Data

(60) Provisional application No. 61/409,625, filed on Nov. 3, 2010.

(51) Int. Cl.
 *B29C 33/44* (2006.01)
(52) U.S. Cl.
 USPC ........ 264/271.1; 264/250; 264/255; 264/318; 425/577; 425/438; 425/DIG. 58; 351/86
(58) Field of Classification Search
 USPC .............. 351/83, 86, 154, 178; 264/294, 274, 264/271.1, 275, 318, 250, 255, 259, 264, 264/279; 425/577, 438, 127, DIG. 58, 121, 425/123, 129.1
 See application file for complete search history.

(56) References Cited

U.S. PATENT DOCUMENTS

| | | | |
|---|---|---|---|
| 3,406,232 A | 10/1968 | Barker | |
| 4,027,723 A | 6/1977 | Maurino et al. | |
| 4,161,060 A | 7/1979 | Lenne et al. | |
| 4,383,673 A | 5/1983 | Laprade et al. | |
| 4,921,341 A | 5/1990 | Ace | |
| 5,693,036 A | 12/1997 | Kilgour | |
| 6,099,785 A * | 8/2000 | Schweigert et al. | 264/328.1 |
| 2006/0065992 A1* | 3/2006 | Hutchinson et al. | 264/45.1 |
| 2010/0085533 A1 | 4/2010 | Calilung et al. | |

FOREIGN PATENT DOCUMENTS

WO  WO 98/30930  7/1998

* cited by examiner

*Primary Examiner* — Joseph S Del Sole
*Assistant Examiner* — Lawrence D Hohenbrink, Jr.
(74) *Attorney, Agent, or Firm* — Mind Law Firm, P.C.; Justin G. Sanders; Jeromye V. Sartain

(57) ABSTRACT

A gasket apparatus is disclosed for forming an undercut on an inner surface of a molded part, along with corresponding methods for molding and positioning the apparatus within the undercut. The apparatus provides, in an exemplary embodiment, a gasket removably molded about a circumferential perimeter portion of a substantially disk-shaped insert. The perimeter portion is configured for forming a gasket groove in the gasket, the gasket groove itself configured for subsequently accepting and retaining an object therewithin when the insert is removed. The apparatus is configured for extending a distance into the inner surface of the molded part during the molding process, thereby forming the undercut therewithin. Upon cooling of the molded part, the insert is able to be disengaged and removed from gasket, leaving the gasket within the undercut and allowing the object to be positioned and retained within the gasket groove.

14 Claims, 3 Drawing Sheets

GASKET FOR A MOLDED PART AND METHOD OF MANUFACTURE AND USE

RELATED APPLICATIONS

This application claims priority and is entitled to the filing date of U.S. Provisional application Ser. No. 61/409,625, filed Nov. 3, 2010 and entitled "Gasket for a Molded Part and Method of Manufacture and Use." The contents of the aforementioned application are incorporated by reference herein.

INCORPORATION BY REFERENCE

Applicant hereby incorporates herein by reference any and all U.S. patents and U.S. patent applications cited or referred to in this application.

BACKGROUND

1. Field of the Invention

Aspects of this invention relate generally to gaskets, and more particularly to a gasket for a molded part and corresponding method for molding and positioning such a gasket within a groove-like undercut on an inner surface of that molded part.

2. Description of Related Art

By way of background, one major concern in the eyewear industry is how to successfully and consistently form a lens retention groove in at least a portion of an inner surface of the rim of an eyewear frame, for subsequently retaining a lens therewithin. Presently, manufacturers typically use a relatively planar "potato chip" insert. With the insert located within an injection mold, the mold is closed about the insert, and the plastic material is injected into the mold. The insert extends into the cavity of the mold to form the lens retention groove. Upon cooling, the insert is pulled or pushed out. Because the insert tends to be relatively rigid compared to the frame material, and because the frame material tends to be at its most fragile state right after cooling, the lip of the retention groove, along with the rest of the frame, has a tendency to become deformed while being pulled or to snap back and create surface marring and stress fractures that are unacceptable under industry standards. This not only produces a high "scrap rate" (often up to twenty-five percent or more due to unacceptable permanent deformation of the frame), but it also limits frame design options to essentially only those that can accommodate the removal of such a relatively rigid insert during the molding process. Furthermore, manufacturers using such inserts tend to be limited to relatively shallow retention grooves, because deeper grooves would not permit withdrawal of rigid inserts without damage and, thus, even higher scrap rates. This challenge has typically been addressed through the use of improved or alternative inserts that are capable of substantially flexing as they are removed from the molded groove, so as to reduce the likelihood of the groove being deformed or the frame damaged. However, such a solution requires the implementation of an entirely new insert, the cost of which some manufacturers simply cannot afford, and still may not eliminate or sufficiently reduce the potential for damage.

Yet another major concern in the eyewear industry, specifically in designing and molding frames, is ensuring that a uniform pressure or force will be applied about the perimeter of each lens, once it is inserted into the frame, so as not to improperly flex the lens and thereby distort its optics or, worse, fracture the lens. This challenge has typically been addressed through the complexity and expense of precision machining and molding, which can still result in unacceptably high scrap rates and/or limit the possible frame and lens designs. More recently, gaskets made of relatively soft material, such as rubber, and positioned within the lens retention grooves of the frame have been proposed; but the challenge and inconvenience there has been positioning such a gasket within the retention groove and retaining it in place while the lens is being positioned therewithin.

In an attempt to solve this particular problem, U.S. Pat. No. 4,921,341 to Ace discloses a safety lens liner adapted to be mounted on the peripheral edge of an eyeglass lens and shaped to engage a groove on the rim of an eyeglass frame to secure the lens in place. The lens incorporates a circumferential groove on its peripheral edge, which receives a tongue extending inwardly from the inner surface of the liner, for positioning the liner on the peripheral edge of the lens. Thus, the liner is engaged with the lens before the lens is positioned within the retention groove, which therefore still presents problems in use in terms of inserting the lens-liner assembly within the frame. Accordingly, this particular device is expressly designed to be used in frames that have rims configured for selectively opening and/or radially adjusting for accepting the lens therewithin before tightening the rim about the peripheral edge of the lens by means of the usual screw tensioning or the like. Thus, this particular device would very likely be substantially incapable of properly functioning in connection with molded eyewear having no means for selectively opening and/or radially adjusting the frame rim. In other contexts wherein complete and non-opening frame rims are to be employed along with such a liner or gasket, rather than pre-installing the liner on the lens, other prior art teaches only that the separately-formed liner may instead be somehow temporarily deformed and pushed into the lens retention grooves of the frame, which introduces additional complications in connection with positioning and retaining the liner in place and related concerns about its performance.

Therefore, there is still a need for an apparatus, as well as a method of manufacturing and using such an apparatus, that is configured for use in the molding industry and capable of both forming a groove-like undercut on an inner surface of a molded part while reducing the likelihood of damaging that molded part, as well as providing a relatively sufficient amount of cushion to accommodate the later insertion of a separately manufactured part within that undercut, without the apparatus moving out of position. Aspects of the present invention fulfill these needs and provide further related advantages as described in the following summary.

SUMMARY

Aspects of the present invention teach certain benefits in construction and use which give rise to the exemplary advantages described below.

The present invention solves the problems described above by providing a gasket apparatus for forming an undercut on an inner surface of a molded part, along with corresponding methods for molding and positioning the apparatus within the undercut, as discussed in detail below. The apparatus provides, in an exemplary embodiment, a gasket removably molded about a circumferential perimeter portion of a substantially disk-shaped insert, thereby temporarily forming an insert assembly. The insert is sized for approximating the dimensions of an object that is to be subsequently positioned within the molded part. The perimeter portion is configured for forming a gasket groove in the gasket, the gasket groove itself configured for subsequently accepting and retaining the object therewithin when the insert is removed. The insert assembly is configured for extending a distance into the inner surface of the molded part during the molding process, thereby forming the undercut therewithin. Upon cooling of the molded part, the insert is able to be disengaged and removed from gasket, leaving the gasket within the undercut and allowing the object to be positioned and retained within the gasket groove.

A primary objective inherent in the above described apparatus and method of use is to provide advantages not taught by the prior art.

Another objective is to provide such an apparatus that is capable of both forming an undercut on an inner surface of a molded part while reducing the likelihood of damaging that molded part, as well as providing a relatively sufficient amount of cushion to accommodate the later insertion of a separately manufactured part within that undercut, without the apparatus moving out of position.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

DETAILED DESCRIPTION

The above described drawing figures illustrate aspects of the invention in at least one of its exemplary embodiments, which are further defined in detail in the following description.

For illustrative purposes, the present invention will be described in the context of eyewear manufacturing. However, it should be noted that the present invention should not be read as being so limited. In fact, the present invention can be used in the manufacture of virtually any molded part that requires a gasket or similar cushion to be molded and positioned within a groove or undercut formed on at least a portion of an inner surface of that molded part, to protect the groove and/or accommodate the later insertion of a separately manufactured part within that groove or for other such purpose.

Figure 1:
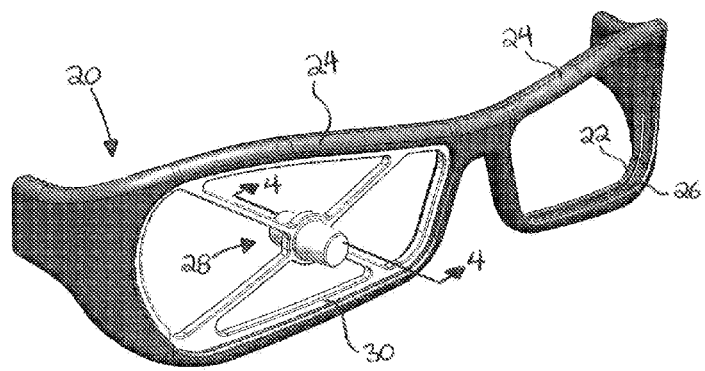
FIG. 1 is a perspective view of an exemplary mold insert, used in forming a retention groove in an exemplary molded eyewear frame, positioned within such an exemplary molded eyewear frame.
Figure 2:
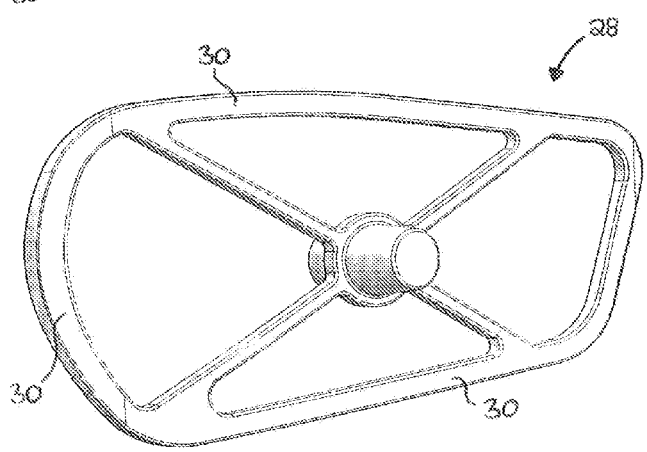
FIG. 2 is a perspective view of the exemplary mold insert.

With reference to FIG. 1, there is shown a perspective view of an exemplary molded eyewear frame 20. An inner surface 22 of each rim 24 of the frame 20 provides a retention groove 26 sized and configured for subsequently accepting and retaining an eyewear lens (not shown) therewithin. Typically, the retention groove 26 is formed during the molding of the frame 20. To accomplish this, an appropriately sized and configured insert 28—an exemplary embodiment of which is shown best in FIG. 2—is positioned within the cavity of the injection mold (not shown) for the frame 20. The mold is closed about the insert 28 and the frame material is then injected into the cavity of the mold over the insert 28; the insert 28 being positioned such that a circumferential perimeter portion 30 extends a distance into the inner surface 22 of the frame 20 being molded, thereby forming the retention groove 26. Upon cooling, the insert 28 is then disengaged from within the now-formed retention groove 26 and removed from the frame 20, to be either discarded or re-used. The rim 24 of the frame 20 is then ready to receive the lens therewithin. It should be noted that the above-described molding process—other than the exemplary insert 28 itself—is very similar to that of the known prior art, which is why these steps are not shown in the drawings.

Figure 3:
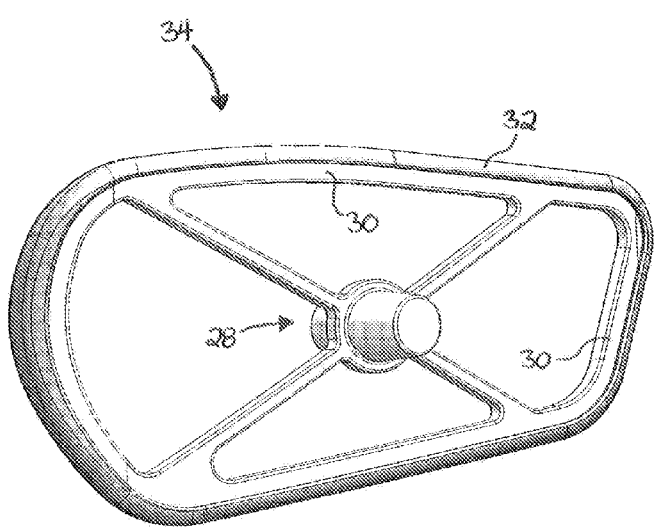
FIG. 3 is a perspective view of an exemplary embodiment of the gasket apparatus as removably molded about a perimeter portion of the exemplary mold insert.

Turning now to the present invention, where the frame 20 requires use of a gasket 32 positioned between the lens and retention groove 26, the gasket 32 itself, as well as its method of molding and positioning, is designed to be substantially seamlessly integrated into the above traditional method of molding the frame 20 and corresponding retention grooves 26. More specifically, as shown in FIG. 3, the gasket 32 is first removably molded about the perimeter portion 30 of the insert 28, thereby temporarily forming an insert assembly 34. As discussed further below, and best shown in FIGS. 4A and 4B, as the gasket 32 is molded about the perimeter portion 30, the perimeter portion 30 forms a gasket groove 36 in the gasket 32, configured for later receiving the lens therewithin when the insert 28 is removed. Thus, the width of the perimeter portion 30 and, in turn, the gasket groove 36 varies depending on the thickness of the respective lens to be subsequently inserted. Additionally, because the shape and curvature, if any, of the perimeter portion 30 preferably approximates that of the lens to be later inserted, the resulting gasket 32 and gasket groove 36 also approximate that shape and curvature so as to substantially accommodate the lens.

Preferably, the gasket 32 is made from a relatively soft, resilient elastomer, such as rubber or the like, which not only allows the gasket 32 to provide a sufficient amount of cushion between the lens and frame 20, but also enables the gasket 32 to withstand the heat and pressure associated with the molding process. Additionally, the material is such that the gasket 32 does not bond with the insert 28 during the molding process. In alternate embodiments, the gasket 32 may be made of any other material, or combination of materials, now known or later developed, that enables the gasket 32 to carry out substantially the same functionality as herein described. Furthermore, in the exemplary embodiment, the material is such that the gasket 32 also does not bond with the frame 20 during the molding process, but rather is physically held in place by other means, as described further below; though, in further embodiments, the material may be such that the gasket 32 does in fact bond with the frame 20 to some degree.

After the gasket 32 has been removably molded about the perimeter portion 30 of the insert 28 and allowed to sufficiently cool, the resulting insert assembly 34 is then positioned within the cavity of the injection mold for the frame 20. The mold is closed about the insert assembly 34 and the frame material is then injected into the cavity of the mold over the insert assembly 34, the insert assembly 34 being positioned such that at least a portion of the gasket 32 extends a distance into the inner surface 22 of the frame 20 being molded, thereby forming the retention groove 26 therewithin. In the exemplary embodiment, as best shown in the cross-sectional view of FIG. 4A, the insert assembly 34 is preferably positioned such that the entire gasket 32, along with a portion of the perimeter portion 30 of the insert 28, extends into the inner surface 22 to form a relatively deeper retention groove 26, the benefit of which is discussed further below. As shown in FIG.

4B, upon cooling, the insert 28 is then disengaged from within the gasket groove 36, leaving the gasket 32 positioned within the now-formed retention groove 26 of the frame 20. Once removed, the insert 28 is either discarded or re-used.

Given the relatively soft, resilient properties of the gasket 32, the actual depth of the gasket groove 36, and thus the distance by which the perimeter portion 30 of the relatively rigid insert 28 must extend into the retention groove 26, may be substantially shallower than necessary without sacrificing the ability of the frame 20 to adequately and securely retain the lens. Where a relatively larger lens is to be inserted into the frame 20, the gasket 32 simply compresses accordingly to accommodate. This can be extremely beneficial since the insert 28, during removal, is typically pushed or pulled by applying a substantially perpendicular force thereto; thus, the less the perimeter portion 30 extends into the retention groove 26, in combination with the relatively soft, resilient properties of the gasket 32, the easier it is to remove the insert 28, while also reducing the likelihood of damaging the frame 20 in the process, yet still effectively providing an even relatively deeper retention groove 26, which again has advantages in later securing the lenses within the frame 20.

Figure 5:
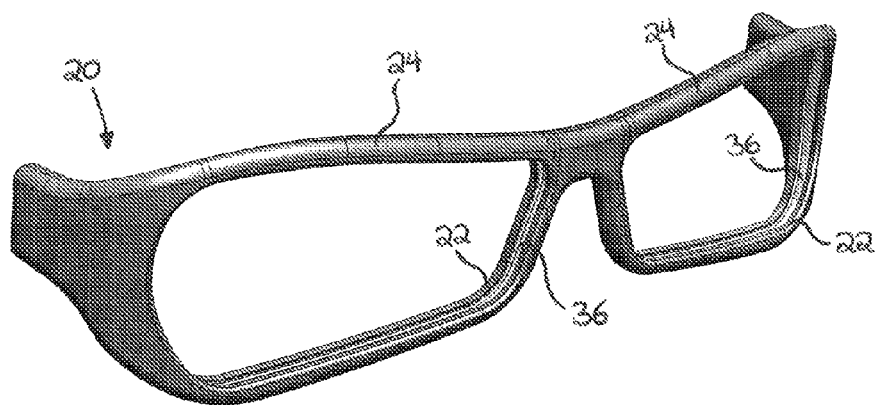
FIG. 5 is a perspective view of the exemplary molded eyewear frame with an exemplary gasket apparatus positioned within each of the retention grooves.

As shown in FIG. 5, once the insert 28 is removed, the rim 24 of the frame 20 is then ready to receive the lens therewithin, the gasket 32 and gasket groove 36 configured for accepting and enabling the lens to rest, and essentially float, within the retention groove 26, thereby substantially absorbing and isolating any potentially lens-deforming forces created by, or distributed through, the frame 20 such that the lens remains substantially unaffected by such forces.

Referring again to FIGS. 4A and 4B, during the exemplary molding process, as mentioned above, the insert assembly 34 is preferably positioned such that the entire gasket 32, along with a portion of the perimeter portion 30 of the insert 28, extends into the inner surface 22 of the frame 20 being molded, so as to form a relatively deeper retention groove 26. In this way, the rim 24 of the frame 20 is molded around the gasket 32, thereby physically retaining the gasket 32 within the retention groove 26 after the insert 28 is removed so as to substantially prevent the gasket 32 from falling out or otherwise moving out of position; the shape of the gasket 32 matching and conforming to the retention groove 26 alone serving to secure the gasket 32 therein, much like an inflated tube within a bicycle tire. Moreover, with the gasket 32 being over-molded or otherwise positioned on the insert 28 in a first operation to produce the insert assembly 34, it will be appreciated that the mold cavity for the frame 20, into which such insert assembly 34 is then placed to mold the frame 20 in a second operation, need not have its surface that forms the inner surface 22 of the frame 20 be in contact with the gasket 32 when the mold closes, whereby opposing inwardly projecting flanges 38, continuous with the inner surface 22 and so formed at the opening of the retention groove 26 in each rim 24, would be molded into the frame 20 and thus serve to positively trap or effectively encase the gasket 32 within the retention groove 26 even after the insert 28 is removed. In such a case, the perimeter portion 30 of the insert 28 thus causes the flanges 38 to be coterminous or even with the side walls of the gasket groove 36, thereby forming one continuous groove surface along which the lens perimeter would be retained. Those skilled in the art will appreciate that the existence and size of such one or more flanges 38 may vary depending on such factors as the gasket 32 and frame 20 materials, the depth of the retention groove 26, and the size and type of lenses to be inserted in the finished frame 20, such that the geometry of the illustrated retention groove 26, including opposite flanges 38 at its opening, is to be understood as merely exemplary of aspects of the present invention. As such, and by way of further example, in situations where the lens is particularly large relative to the rim 24 (i.e., the retention groove 26 is comparatively deeper) or the optics of the lens are particularly sensitive to any forces that may be distributed through the frame 20, it may be desirable to not have any flanges 38 so as to be assured that the lens is contacting only the gasket 32.

Figure 4A:
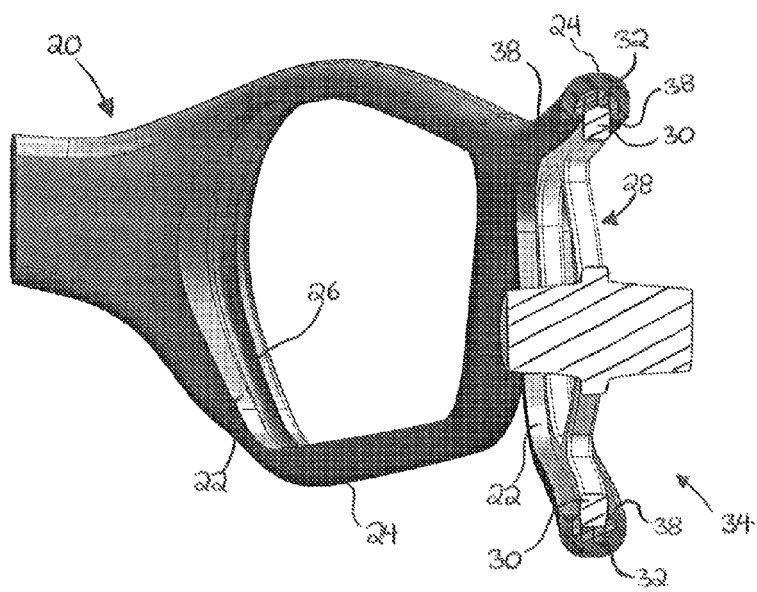
FIGS. 4A and 4B are partial cross-sectional views taken along line 4-4 of FIG. 1.
Figure 4B:
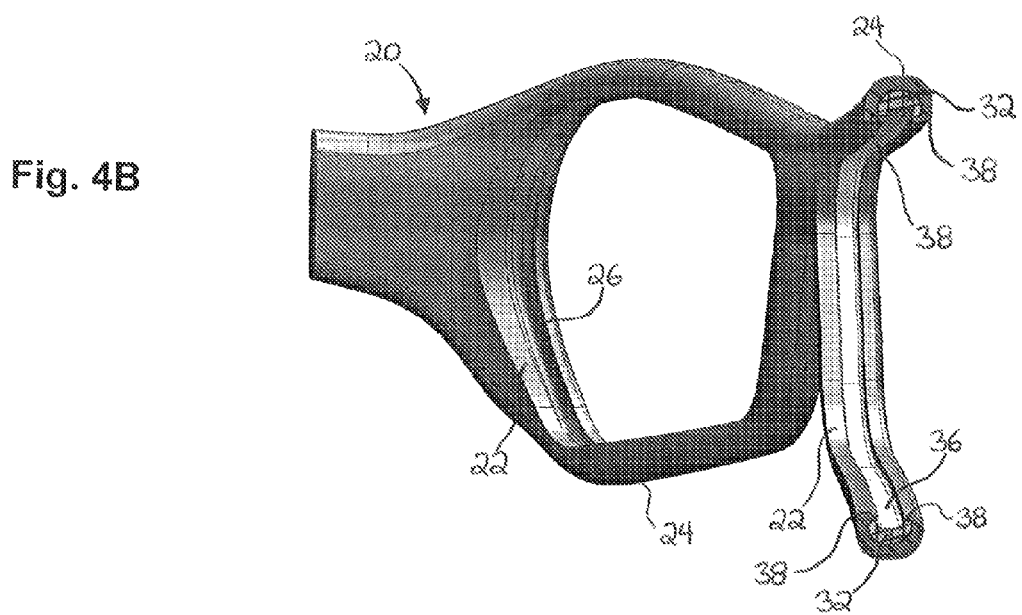

It should be noted that, depending on the particular application, the insert 28 may be left in the gasket groove 32 for a period of time after the molded part has cooled and while the molded part undergoes various post-processing procedures, such as polishing, painting or finishing, in order to better protect and maintain the integrity of the gasket 32 and gasket groove 32 during those procedures. It should also be noted that while the insert 28 shown in the drawings is substantially wheel-and-spoke-shaped, the insert 28 may take on any number of configurations, now known or later developed, such as a ring or relatively planar "potato chip" shape, so long as the insert 28 is able to carry out substantially the same functionality as herein described. Thus, the present invention should not be read as being so limited. Additionally, while FIGS. 1, 4A and 4B show the molding process being performed on only one rim 24 of the frame 20 for illustrative purposes, in practice, the molding process would preferably be performed on each of the rims 24 simultaneously.

To summarize, regarding the exemplary embodiments of the present invention as shown and described herein, it will be appreciated that a gasket for a molded part, and corresponding methods for molding and positioning such a gasket within a groove-like undercut on an inner surface of a molded part, is disclosed. Because the principles of the invention, including its exemplary methods of manufacture and use, may be practiced in a number of configurations and contexts beyond those shown and described, it is to be understood that the invention is not in any way limited by the exemplary embodiments, but is generally directed to a gasket for a molded part and is able to take numerous forms to do so without departing from the spirit and scope of the invention.

It should be noted that the various features of each of the above-described embodiments may be combined in any logical manner and are intended to be included within the scope of the present invention. It will also be appreciated by those skilled in the art that the present invention is not limited to the particular geometries and materials of construction disclosed, but may instead entail other functionally comparable structure, now known or later developed, without departing from the spirit and scope of the invention. Furthermore, while aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor believes that the claimed subject matter is the invention.

What is claimed is:

1. A gasket apparatus for forming an undercut on an inner surface of a molded part, the apparatus comprising:
   a substantially disk-shaped insert configured for approximating the dimensions of an object to be subsequently positioned within the undercut of the molded part;
   a gasket removably molded about a circumferential perimeter portion of the insert, the perimeter portion forming a continuous and annular gasket groove on an inner surface of the gasket, the gasket groove sized and configured for subsequently accepting and retaining the object therewithin after the perimeter portion is removed therefrom;

the gasket, while engaged about the perimeter portion of the insert, configured for extending a distance into the inner surface of the separate molded part during the molding process, thereby forming the undercut on the inner surface of the molded part;

whereby, during the molding process, upon cooling of the molded part, the insert is able to be disengaged and removed from the gasket groove, leaving the gasket within the undercut and allowing the object to be positioned and retained within the gasket groove, such that the gasket is positioned between the object and the undercut of the molded part.

2. The gasket apparatus of claim 1, wherein the thickness of the perimeter portion and, thus, the width of the gasket groove, each approximates the thickness of the object.

3. The gasket apparatus of claim 1, wherein the insert is further configured for approximating the curvature of the object.

4. The gasket apparatus of claim 1, wherein the gasket is made from a relatively soft, resilient elastomer for enabling the gasket to provide a sufficient amount of cushion between the object and molded part and to withstand the heat and pressure associated with the molding process.

5. The gasket apparatus of claim 1, wherein the entire gasket, along with a portion of the perimeter portion of the insert, is configured for extending a distance into the inner surface of the molded part during the molding process, thereby forming the undercut substantially around the gasket.

6. The gasket apparatus of claim 5, wherein the entire gasket, along with a portion of the perimeter portion of the insert, is further configured for forming a pair of opposing inwardly projecting flanges continuous with the inner surface of the molded part and so formed at the opening of the undercut, the flanges configured for physically retaining the gasket within the undercut.

7. The gasket apparatus of claim 6, wherein the flanges are coterminous or even with the side walls of the gasket groove, thereby forming a continuous groove surface along which a perimeter of the object would be retained.

8. A method for molding and positioning a gasket within an undercut on an inner surface of a molded part for subsequently accepting and retaining an object therewithin, the method comprising the steps of:

removably molding a gasket about a circumferential perimeter portion of a substantially disk-shaped insert sized for approximating the dimensions of the object, the gasket and insert together temporarily forming an insert assembly;

positioning the insert assembly within a cavity of an injection mold for the molded part such that at least a portion of the gasket extends a distance into the inner surface of the molded part to be molded;

injecting a material into the cavity of the mold to form the molded part, the insert assembly assisting in forming the undercut substantially about the gasket; and upon cooling of the molded part, disengaging and removing the insert from the gasket, the perimeter portion having formed a continuous and annular gasket groove within gasket, the gasket groove sized and configured for accepting and retaining the object therewithin.

9. The method of claim 8, wherein the step of removably molding the gasket about the perimeter portion of the insert further comprises molding the gasket out of a relatively soft, resilient elastomer.

10. The method of claim 8, further comprising the step of positioning the insert assembly within the cavity of the injection mold such that the entire gasket, along with a portion of the perimeter portion of the insert, extends a distance into the inner surface of the molded part to be molded, for assisting in forming the undercut substantially around the gasket, along with a pair of opposing inwardly projecting flanges configured for physically retaining the gasket within the undercut.

11. A method for molding and positioning a gasket within an undercut on an inner surface of a molded part for subsequently accepting and retaining an object therewithin, the method comprising the steps of:

removably molding a gasket about a circumferential perimeter portion of a substantially disk-shaped insert sized for approximating the dimensions of the object, the gasket and insert together temporarily forming an insert assembly;

positioning the insert assembly within a cavity of an injection mold for the molded part such that the entire gasket, along with a portion of the perimeter portion of the insert, extends a distance into the inner surface of the molded part to be molded;

injecting a material into the cavity of the mold to form the molded part, the insert assembly assisting in forming the undercut substantially around the gasket, along with a pair of opposing inwardly projecting flanges configured for physically retaining the gasket within the undercut; and upon cooling of the molded part, disengaging and removing the insert from the gasket, the perimeter portion having formed a continuous and annular gasket groove within gasket, the gasket groove sized and configured for accepting and retaining the object therewithin.

12. The gasket apparatus of claim 1, wherein the substantially disk-shaped insert is of monolithic construction.

13. The gasket apparatus of claim 1, wherein the undercut formed on the inner surface of the molded part is continuous and annular.

14. A gasket apparatus for forming an undercut on an inner surface of a molded part, the apparatus comprising:

a substantially disk-shaped insert configured for approximating the dimensions of an object to be subsequently positioned within the undercut of the molded part;

a gasket removably molded about a circumferential perimeter portion of the insert, the perimeter portion forming a gasket groove on an inner surface of the gasket, the gasket groove sized and configured for subsequently accepting and retaining the object therewithin after the perimeter portion is removed therefrom;

the gasket, while engaged about the perimeter portion of the insert, configured for extending a distance into the inner surface of the separate molded part during the molding process, thereby forming the continuous and annular undercut on the inner surface of the molded part;

whereby, during the molding process, upon cooling of the molded part, the insert is able to be disengaged and removed from the gasket groove, leaving the gasket within the undercut and allowing the object to be positioned and retained within the gasket groove, such that the gasket is positioned between the object and the undercut of the molded part.

* * * * *